(12) United States Patent
Erdmann et al.

(10) Patent No.: US 9,779,898 B2
(45) Date of Patent: Oct. 3, 2017

(54) SELF-POWERED ENERGY HARVESTING SWITCH AND METHOD FOR HARVESTING ENERGY

(71) Applicant: PHILIPS LIGHTING HOLDING B.V., Eindhoven (NL)

(72) Inventors: Bozena Erdmann, Aachen (DE); Adrianus Johannes Josephus Van Der Horst, Vught (NL); Arthur Robert Van Es, Eindhoven (NL); Bas Willibrord De Wit, Dordrecht (NL); Armand Michel Marie Lelkens, Heerlen (NL); Ludovicus Marinus Gerardus Maria Tolhuizen, Waalre (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 299 days.

(21) Appl. No.: 14/367,515

(22) PCT Filed: Dec. 12, 2012

(86) PCT No.: PCT/IB2012/057202
§ 371 (c)(1),
(2) Date: Jun. 20, 2014

(87) PCT Pub. No.: WO2013/093715
PCT Pub. Date: Jun. 27, 2013

(65) Prior Publication Data
US 2014/0353135 A1    Dec. 4, 2014

Related U.S. Application Data

(60) Provisional application No. 61/577,843, filed on Dec. 20, 2011.

(51) Int. Cl.
*B23K 11/24* (2006.01)
*H02B 1/24* (2006.01)
(Continued)

(52) U.S. Cl.
CPC ............ *H01H 25/06* (2013.01); *H02K 7/1876* (2013.01); *H02K 7/1892* (2013.01); *H02K 35/00* (2013.01);
(Continued)

(58) Field of Classification Search
CPC ............ H01H 25/06; H01H 2239/076; H01H 2300/032; H01H 2300/052; H02K 35/00;
(Continued)

(56) References Cited

U.S. PATENT DOCUMENTS 6,953,904 B1 * 10/2005 Meagher .................. H01H 3/14
200/529
7,960,661 B2 * 6/2011 Wlotzka .............. H01H 25/008
200/14
(Continued)

FOREIGN PATENT DOCUMENTS

DE    1765317 A1    7/1971
DE    4411919 A1    10/1995
JP    04018938 U1    2/1992

*Primary Examiner* — Jared Fureman
*Assistant Examiner* — Esayas Yeshaw
(74) *Attorney, Agent, or Firm* — Meenakshy Chakravorty

(57) ABSTRACT

A switch device (10) and method for generation of energy for operating the switch device (10), wherein the switch device (10) is provided with a drive unit (120) interacting with an actuation device operable by a user, and with a moving device (130) configured to be set in motion by the drive unit (120), and with an energy harvester (132, 140, 140a) for providing energy to the switch device (10) in dependence on a motion of the moving device (130), such that energy for commands or other operations is provided to the switch device (10). The moving device (130) is config-
(Continued)

ured to be repeatedly repositioned in relation to a defined zero position, as long as it has kinetic energy, in order to provide kinetic energy which can be converted in electric energy by the energy harvester (132, 140, 140a). Such an electromechanical device for generating energy can ensure wireless operation of the switch device (10) without the need of batteries or any other kind of power supply.

16 Claims, 4 Drawing Sheets

(51) Int. Cl.
    *H01H 25/06*     (2006.01)
    *H02K 35/00*     (2006.01)
    *H02K 7/18*     (2006.01)

(52) U.S. Cl.
    CPC . *H01H 2239/076* (2013.01); *H01H 2300/032* (2013.01); *H01H 2300/052* (2013.01); *H02K 2201/18* (2013.01); *Y02B 90/224* (2013.01); *Y04S 20/14* (2013.01)

(58) Field of Classification Search
    CPC ............... H02K 7/1876; H02K 7/1892; H02K 2201/18; Y04S 20/14; Y02B 90/224
    USPC .......................................................... 307/112
    See application file for complete search history.

(56) References Cited

U.S. PATENT DOCUMENTS

| | | | |
|---|---|---|---|
| 2003/0075928 A1* | 4/2003 | Carpenter | H02K 53/00 290/1 R |
| 2004/0174287 A1 | 9/2004 | Deak | |
| 2007/0051847 A1* | 3/2007 | Quitmeyer | F16H 25/205 244/99.2 |
| 2009/0090334 A1* | 4/2009 | Hyde | F02B 63/04 123/51 R |
| 2010/0327672 A1* | 12/2010 | Roberts | H02K 35/00 310/25 |
| 2011/0133488 A1* | 6/2011 | Roberts | H02K 35/02 290/1 R |
| 2013/0140823 A1* | 6/2013 | Henry | F03B 13/264 290/53 |

* cited by examiner

SELF-POWERED ENERGY HARVESTING SWITCH AND METHOD FOR HARVESTING ENERGY

CROSS-REFERENCE TO PRIOR APPLICATIONS

This application is the U.S. National Phase application under 35 U.S.C. §371 of International Application No. PCT/IB12/057202, filed on Dec. 12, 2012, which claims the benefit of [e.g., U.S. Provisional Patent Application No. or European Patent Application No.] 61/577,843, filed on Dec. 20, 2011. These applications are hereby incorporated by reference herein.

FIELD OF THE INVENTION

The present invention relates to a self-powered switch device and a method of generating energy, especially energy required for operation and communication and interaction with an operator.

BACKGROUND OF THE INVENTION

Wireless switches, remote controls, sensors, energy control devices or the like which are self-powered provide the advantage of device positioning independently of specific energy supply situations like cables or power outlets. The installation locations can be chosen and determined regardless of any power supply constraints, and even portable respectively mobile control and sensing devices can be provided. But usually, in order to provide energy, switch devices are battery-operated, with lifetime dependent on power supply, and replacement of batteries is required, usually after an uncertain time period. Such replacement operations implicate time-consuming and laborious and costly installation work, depending on the location of each switch. Therefore, self-powered devices offer a promising alternative in order to reduce the operating expense of sensing and control systems, e.g. in the field of facility management.

There is a plurality of different switches already in use, wireless and battery-powered, or wired, each based on a specific control technology. For example, dial dimmer switches can be used for e.g. lighting control, having one ore more knobs for adjusting power supply, e.g. for lighting from full light to very dim and all brightness measures in between, and these switches can be combined with rotary dimmer switches. Also, the switches can be provided as slide dimmer switches having a sliding handle for continuously adapting the level of supplied power, also in conjunction with a separate button for on/off function. Further, touch pad dimmers can be provided for adjusting power supply in dependence on any position of a user's finger on the pad, and these touch pad dimmers can advantageously be used e.g. in applications with specific design requirements. Also, plug-in dimmer switches can be installed between a power supply outlet and a consumer load, representing the simplest way to provide a power control in case sockets are provided. They do not require any installation at all, as they can directly be plugged between a consumer load and an outlet of a power network.

Further, there is a plurality of different energy harvesting controls already in use, e.g. in a so called PTM200 push-button multichannel switch module, or in a so called ECO100 or ECO200 harvesting module by EnOcean® in combination e.g. with a so called PTM230/PTM330 or PTM332 transmitter module by EnOcean®. In the PTM200, a common electro-dynamic energy transducer can be actuated by an energy bow which can be pushed from outside the module and released, and pushing and releasing each generates specific wireless data telegram transmitting the operating status of a specific number of contact nipples, especially four contact nipples, when activating the bow. There are different energy harvesting mechanisms already in use. For example, the ECO100/ECO200 is provided with an electro-dynamic energy converter for linear motion which is actuated by a spring which can be pushed from outside the device. It can be used to power the PTM230/PTM330/PTM332 transmitter module, sending—when an energy pulse is supplied—an RF telegram which is transmitted including a unique 32-bit module ID, the polarity of the energy pulse, and the operating status of four contact nipples.

SUMMARY OF THE INVENTION

An object of the present invention is to provide a wireless switch device which is simple for the user to operate and robust, wherein energy required for operation, e.g. sending control commands, can be generated by the device itself.

A further object of the present invention is to provide an energy harvesting device for a switch device which allows for realizing an on/off function and preferably also a dimming function in an intuitive and convenient way for a user.

A further object of the present invention is to provide a device for harvesting energy for a switch device which is self-powered, wherein the device for harvesting energy can ensure that upon operation of a knob by a user, electric energy can be provided for wireless operation of the switch device.

At least one of these objects is achieved by a switch device as claimed in claim 1 and by a method for providing energy as claimed in claim 12.

Accordingly, a switch device is provided, comprising a drive unit configured to interact with an actuation device operable by external force, e.g. by a human user or machine movement, and provided at the switch device, a moving device configured to be set in motion by the drive unit, an energy harvester coupled with the moving device, for providing electric energy to the switch device responsive to a motion of the moving device, and a position return device coupled to the moving device, wherein the moving device is configured to be repositioned by the position return device in relation to a defined zero position. In other words, the moving device can be brought back to a zero position, in order to be set in motion again responsive to a further actuation. Also, the position return device can be configured to repeatedly bring back the moving device to the zero position. Thereby, the moving device does not necessarily have to oscillate for a plurality of times. Also, only one single relative movement can provide for energy.

This ensures that in reaction to an actuation by a user, electric energy is provided to the switch device, and the user only has to carry out actions he had become accustomed to, namely the actuation of a knob, e.g. in order to control lighting; no additional action dedicated for energy harvesting is required. Thereby, the energy harvester is configured to provide energy to the switch device e.g. for transmitting a command based on the operation of a user. With this switch device, an electromechanical arrangement is provided for conversion of kinetic energy in electric energy.

The drive unit is coupled to the actuation device. In particular, the drive unit can be coupled to the actuation device in such a way that a specific motion of the actuation device evokes a specific motion of the drive unit. The drive unit can be coupled rigidly to the actuation device, and the coupling can be provided in the form of interdependent profiles respectively lateral areas at each of the drive unit and actuation device and which interact with each other. The moving device can be set in a motion responsive to a specific amount of motion of the drive unit. Once set in motion, the moving device can move independently from any motion of the drive unit. In one embodiment, the moving device can move as long as it has kinetic energy which can be converted in electric energy. The moving device can be suspended elastically, whereas the drive unit is suspended rigidly. The moving device and the energy harvester can constitute the main components of an electromechanical arrangement, but also the energy harvester itself can constitute the main components of an electromechanical arrangement for providing electric energy. The energy harvester can be arranged in the area of a zero position of the moving device. In particular, the zero position of the moving device can correspond to a zero position of the energy harvester. In another embodiment, the moving device is moved out of its zero position by a motion of the drive unit, and when disengaged by the drive unit, it returns quickly to the zero position thanks to the position return device, thus harvesting energy.

According to a first aspect, the actuation device is operable, especially by an external force, e.g. a user, in both rotational directions around an actuation axis, wherein the drive unit engages with the moving device in the same way, so that energy is provided to the switch independent of the direction of rotation.

Basically, when the actuation device is rotated by external force, e.g. a user, the moving device is set in motion. In particular, it depends on the exact shape and dimensions of the protrusion and the recess portions engaging each other to what extend the motion of the moving device is coupled to the rotation and/or actual position of the driving unit. In dependence on the amount of the angle with which the actuation device is rotated, the moving device can be set in motion to oscillate freely, or set in motion only to an extend corresponding to a specific angle with which the actuation device is rotated. In particular, it depends on the exact arrangement of the components of the switch device, especially the moving device with respect to the drive unit, as well as the degree of freedom respectively the variance which is given to the protrusion within the recess portion(s). In order to allow for a motion, e.g. an oscillating motion, of the moving device even in case the drive unit is rotated to such an extend that the protrusion remains within one of the recesses, the drive unit can decouple from the actuation device. This can be done by a mechanism which separates the actuation device and the drive unit in dependence on the angle of rotation so that the drive unit can rotate automatically independent from the position of the actuation device. Once the moving device is brought back to a zero position, or once a new operation on the actuation device started, the connection between the actuation device and the drive unit is reconstituted, especially by engaging back in a gearing or the like. Thereby, an exact interpretation of a user's command can be realized, and energy can be provided even in case there is only a rotation by a small angle. This also allows continuous rotation by a larger angle, resulting in repetitive engaging of the drive unit with the moving device.

The components of the switch device can be arranged such that the moving device consists of an intermediate member between the drive unit and the energy harvester. In particular, the drive unit can be rotated around an axis which is orthogonal to >an axis along/to the plane in which the moving device is set in motion, and the energy harvester can be rotated around an axis which is parallel to the rotation axis of the drive unit. Also, the drive unit can be rotated around an axis which is parallel to an axis of rotation of the moving device.

Also, the switch device can be provided with an energy storage. The energy storage can store the excess energy, not consumed during the processing, storing, signal transmission, provisioning of feedback and/or other handling operations triggered by the switch actuation. The stored energy can subsequently be used, e.g. for maintenance operations like processing, signal transmission and/or signal reception, for provisioning of feedback, and the like. The energy storage can provide energy for a command instantaneously in reaction on a user's actuation of the actuation device. Electric energy provided by a motion of the moving device in response to this user's actuation can be stored in the energy storage in order to provide and keep at hand energy for a prospective command. The energy storage can be coupled with the energy harvester.

According to a second aspect which can be combined with the first aspect, the actuation device is operable, especially by a user, in a rotational direction around an actuation axis and in a translational direction along the actuation axis. Thereby, energy can be generated both responsive to rotation and pushing or releasing. Also, between the actuation device and the drive unit, a mechanical blocking device is provided in order to prevent rotation of the actuation device when the actuation device is operated along the translational direction. Thereby, it can be ensured that each user command is definite, and an actuation along the actuation axis can be done devoid of any sensible reaction forces.

According to a third aspect which can be combined with any one of the first and second aspects, the actuation device is provided with a screw thread configured to connect the drive unit with the actuation device. Thereby, the drive unit can be set in motion responsive to a translational actuation of the actuation device. The drive unit can be hold in a specific position with respect to a corpus of the switch device when the actuation device is pressed or released. In particular, the drive unit can be retained by an inner wall of the switch device, and at the same time, the actuation device can engage in recesses provided in the corpus of the switch device, in order to prevent rotation. Also, an interlocking device can be provided at the actuation device for preventing relative movement between the drive unit and the actuation device. Thereby, it can be ensured that a rotational movement of the actuation device can be transmitted in a conformal way in a corresponding rotational movement of the drive unit.

According to an fourth aspect which can be combined with any one of the first to third aspects, the actuation device is provided with a shaft which extends along an actuation axis of the actuation device and which is movably arranged within a corpus of the switch device, and wherein an elastic element is provided at the shaft between the actuation device and the corpus, especially for preventing movement of the actuation device along the actuation axis. Thereby, it can easily be differentiated between a rotation of the actuation device and a translational actuation of the actuation device.

According to a fifth aspect which can be combined with any one of the first to fourth aspects, the actuation device is elastically arranged within a corpus of the switch device, and wherein a blocking element is provided at the actuation device, for preventing relative movement between the actuation device and the corpus of the switch, especially in a translational direction. The blocking element can be provided in the form of a snap ring or locking ring. The elastic arrangement can be realized by a spring acting on a wall of the corpus, especially from one side, and the blocking element can be provided at the other side of the wall. Thereby, support of the actuation device within the switch device can be ensured, and the actuation device can easily be mounted at the corpus.

The switch can contain one or more group of: energy conditioning element (e.g. a DC/DC converter), processing unit, memory, feedback means (e.g. LED diodes), further hardware means for interaction with the switch (e.g. dip switches or pinhole contact, e.g. for switch configuration). The switch device can include an emitter, and the energy can be provided for emitting control commands by a communication interface (e.g. a wireless communication interface according to 802.15.4/ZigBee Green Power protocol suite). The communication interface can be provide for at least one out of the group of secure communication over radio, bidirectional communication with from and to the switch device for commissioning and/or maintenance of network parameters, and frequency agility.

According to a sixth aspect which can be combined with any one of the first to fifth aspects, the switch device further comprises a sensor configured to detect an actuation and to differentiate between rotational actuation around an actuation axis and actuation along the actuation axis. Both operation types can result in different control commands being generated. In other words, the switch provides for translating the actuation operations into more than one action. In one embodiment, the action is transmission of a control signal, preferably a wireless control signal, and the translational movement results different action than the rotational movement. For example, the translational movement may result in transmission of an on/off or toggle command, and the rotational movement in a dimming updown operation, depending on the CW/CCW direction of the rotation. A combination of both types of movements can provide for further control operation. Electronic means to differentiate the operations may be provided in a plurality of different forms, e.g. contacts, diodes, sensors. In another embodiment, the one or more actuations can result in one or more of operations from a group comprising: measurement, calculation, storage, physical indication, physical actuation and communication, Further, the switch device can be provided for the management of facilities and/or complete buildings.

According to a seventh aspect which can be combined with any one of the first to sixth aspects, the moving device is provided with at least one protrusion which is configured to engage in recess portions of the drive unit. Thereby, the moving device can be set in motion responsive to a specific motion of the drive unit, so that a considerable motion of the drive unit provides for a considerable amount of kinetic energy of the moving device. The recess portion can be provided as a part of a gear wheel. The energy harvester can be configured to convert kinetic energy of the moving device into electric energy provided for operation of the switch device. The protrusion can be provided with a symmetric shape with respect to an x-axis pointing in the direction of the drive unit, the x-axis being orthogonal to a y-axis along which the moving device carries out a translational movement, and the x-axis being orthogonal to a z-axis around which the drive unit is actuated for rotation. The protrusion can be provided in the form of a bar, a protruding rib, or a rim, or the like, from which the axis of symmetry coincides with an axis defining the zero position. The geometry respectively shape of the moving device can be described by a T-profile, the upper bar of the T being suspended between position return devices, and the protrusion arranged orthogonally to the upper bar. The drive unit can be provided with a symmetric shape with respect to the z-axis, so that the moving device is set in motion by the drive unit in the same way independent of a rotational direction around the z-axis in which the drive unit is actuated by a user, and also independent of any linear, translational direction in which the actuation device can be actuated by a user. Also, not only rotation, but also linear actuation can result in rotation around the actuation axis and in a rotation of the drive unit.

Also, the recess portions can have a symmetric shape with respect to an axis passing the zero position and the actuation axis of the drive unit, so that the moving device is set in motion in a respective translational direction in the same way when the actuation device is rotated by a user. Thereafter, the moving device can move in both translational direction, wherein the motion can be an oscillation, and this oscillation can be independent of the exact position of the actuation device. Thereby, energy can be provided to the switch device independent of the kind of actuation of a user.

According to an eighth aspect which can be combined with any one of the first to seventh aspects, the position return device coupled to the moving device is composed of one or several mechanical elements, wherein the mechanical elements provide forces counteracting the motion respectively rotation of the drive unit. Thereby, an electromechanical arrangement can be provided which ensures that the moving device always reaches a zero position and rests in the zero position, when there is no actuation by a user. In one embodiment, the position return device is provided for bringing back the moving device towards a zero position in such a way that a restoring force is smaller than the force of inertia of the moving device, once the moving device has been set in motion by the drive unit. Thus, kinetic energy of the moving device can be conversed in electric energy over a period of a certain length of time, as the moving device holds on moving for a certain length of time. In another embodiment, the position return device is provided for bringing back the moving device towards a zero position in such a way that a restoring force is greater than the force of inertia of the moving device, and thus the moving device immediately and quickly returns to the zero position. Thus, the kinetic energy of the moving device returning to its zero position, preferably resulting—directly or indirectly, via another kinetic energy coupling—in change of electromagnetic field can be conversed in electric energy. Thereby, the speed of movement is expected to be proportional to the speed of change in the electromagnetic field, thus in turn being proportional to the amount of excitable energy. Advantageously, the position return device is composed of one or several elastic mechanical elements. The position return device can be provided in the form of one or several springs, especially extension springs. The position return device can be coupled to the moving device at two opposing ends of the moving device. Alternatively, the position return device is coupled to the moving device at only one end or one portion for coupling the position return device to the moving device.

According to a ninth aspect which can be combined with any one of the first to eighth aspects, the energy harvester is composed of a magnetic block arranged at the moving device and at least one conducting element, e.g. generator coil, with respect to which the magnetic block moves. This facilitates to realize a compact arrangement, and also provides for a certain mass of the moving device, ensuring forces of inertia and a certain amount of kinetic energy. Further, no further moving part or oscillating component is required, as the kinetic energy of the moving device, resulting in the change of electromagnetic field, can directly be converted in electrical energy within the conducting element. The moving device also can be constituted by the magnetic block, at least to a major extend.

According to a tenth aspect which can be combined with any one of the first to ninth aspects, the moving device is supported in guidance like guides, guide contacts or slides which extent orthogonal to a rotation axis of the drive unit, such that the moving device is moved in a translational direction when the actuation device is rotated by a user, and the energy harvester is composed of a rack portion provided on the moving device. This ensures that the moving device moves along a defined translational axis, and that no energy is dissipated because of any uncontrolled lateral motion of the moving device. Further, the energy harvester can be composed of a generator which is actuated around a generator axis by the rack portion in dependence on motion of the moving device. A gear wheel can be arranged at the generator, and the rack portion can engage the gear wheel.

Furthermore, at least one of the above mentioned objects is achieved by a method for providing energy as claimed in claim 12.

Accordingly, the method for providing energy to a switch device for wireless operation of the switch device by an electromechanical arrangement provided within the switch device comprises the steps of actuating a drive unit mechanically interacting with an actuation device responsive to an operation of the actuation device of the switch device by a user, and responsive to the actuation of the drive unit, setting in motion of a moving device engaging the drive unit, and responsive to the motion of the moving device, harvesting energy for wireless operation of the switch device by relative movement of the moving device with respect to an energy harvester, and repeatedly reposition the moving device in relation to a defined zero position by a position return device. This ensures that in reaction on a user's input, electric energy is provided to the switch device by direct conversion of kinetic or mechanical energy.

According to one aspect, the energy harvester is actuated by the moving device for the time the moving device is moving, and kinetic energy of the moving device is converted in electric energy by the energy harvester. During operation of the drive unit, the moving device can be constantly brought back to the zero position, as long as kinetic energy is provided. In dependence on the actuation of the moving device, the energy harvester can be moved by the moving device with respect to a zero position of the energy harvester. Thereby, it can be ensured that a high amount of the kinetic energy of the moving device can be deployed for providing electric energy to the switch device. The switch device can be provided for power control based on commands emitted by the switch device within a network of a plurality of switch devices. The moving device can be constantly brought back to the zero position by a position return device configured to bring back the oscillation device contrary to both oscillation directions, so that the switch device can be operated by a user based of at least two different user commands respectively user inputs.

Further advantageous embodiments are defined below.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Various embodiments of the present invention will now be described based on a drive unit mechanically interacting with a moving device for providing kinetic energy which can be converted in electrical energy. Of course, the present invention can be used for further forms of energy conversion, or subsidiary steps of energy conversion. It is self-evident to the skilled person that the interaction of the drive unit and moving device shown in the figures can be adapted to a plurality of different types of motion of an actuation device actuated by a user.

The moving device can be positioned between the drive unit and the energy harvester, or it can also include components of the energy harvester. Of course, use for other applications and other measuring parameters is possible as well.

Figure 1:
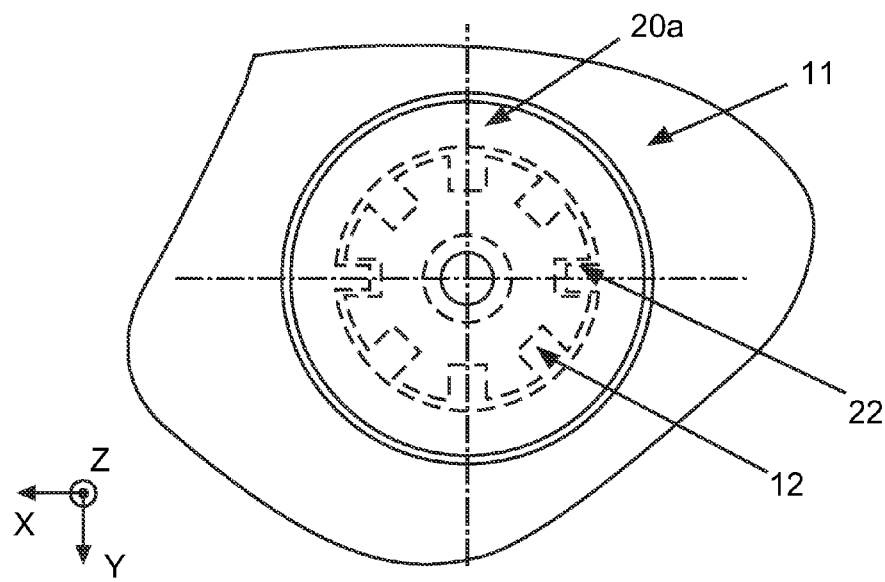
FIG. 1 shows a schematic view of a switch device provided in the form of a knob which can be actuated both in a translational direction and rotationally around an actuation axis, to which the invention can be applied.

FIG. 1 shows a schematic top view of a switch device provided in the form of a knob which can be actuated both in a translational direction and rotationally around an actuation axis, to which the invention can be applied. The switch device is provided with a mechanical blocking device 12 arranged within the switch device behind the device surface 11. An actuation device 20*a* is configured to engage with the mechanical blocking device 12 when the actuation device 20*a* is pressed and moved in a direction opposite to the z-direction. This can be realized by a structured inner profile 22 of the actuation device 20*a* corresponding to a likewise structured outer profile of the mechanical blocking device 12.

Figure 2:
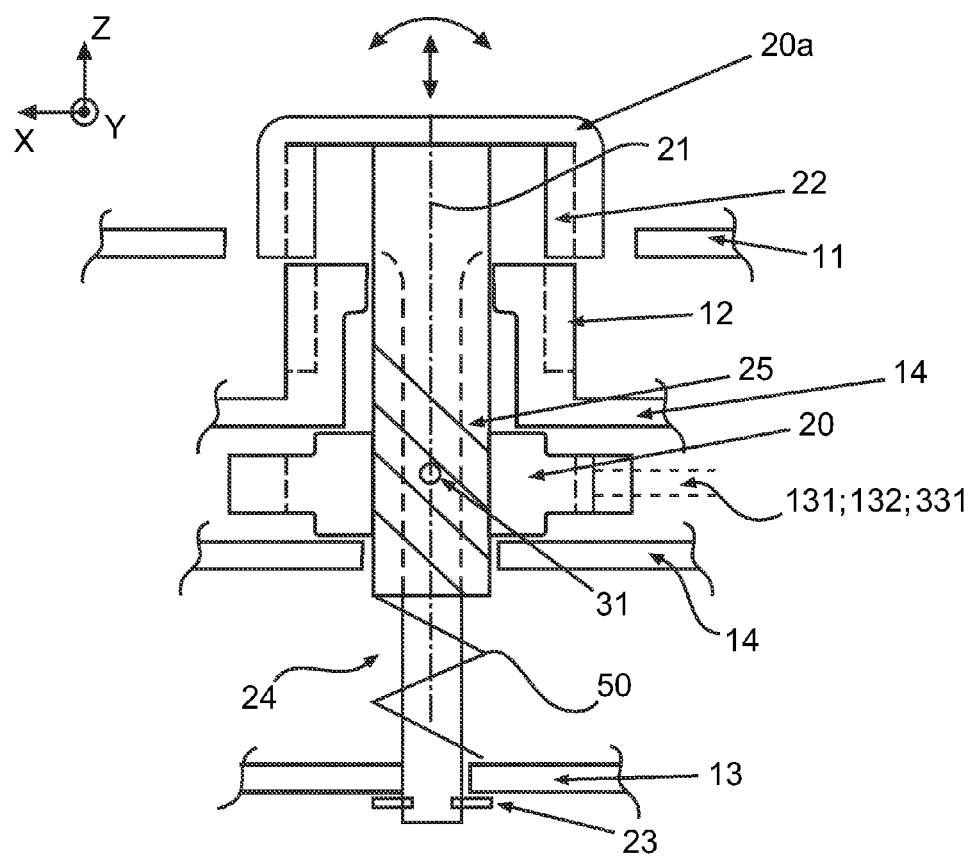
FIG. 2 shows a schematic view of a mechanism for an actuation device interacting with a drive unit and with a moving device, to which the invention can be applied, and which can provide for a plurality of the main components of a switch device according to the invention.

FIG. 2 shows a cross-sectional side view of the actuation device 20*a* supported around and connected to an actuation axis 21, wherein the actuation device 20*a* is provided as a component of a switch device, here the switch device housing indicated by a device surface 11 and several internal walls 13, 14. The actuation device 20*a* comprises a shaft 24 which is supported in at least one of the walls 13, 14. The actuation device 20a is configured to be actuated in a rotation direction around the actuation axis 21 and in a translational direction, whereby the translational direction corresponds to a direction opposite to the z-axis of a coordinate system which defines the surface of a switch device by its x-y-plane, the x-axis facing towards the left side, and the y-axis facing opposite to the viewing direction in which FIG. 2 can be viewed. The z-axis is facing vertically upwards. In order to prevent rotational movement of the actuation device 20a when the actuation device 20a is actuated in a translational direction (corresponding to the direction opposite to the z-axis), the switch device is provided with the mechanical blocking device 12 arranged within the switch device behind the device surface 11. The actuation device 20a is configured to engage with the mechanical blocking device 12 when the actuation device 20a is pressed and moved in a direction opposite to the z-direction. The mechanical blocking device 12 can be part of an inner wall of the switch device.

More specifically, the actuation device 20a further comprises a screw thread 25 for ensuring that the drive unit 20 can be coupled to the actuation device 20a. In particular, the screw thread 25 can be provided in such a way that when the actuation device 20a is pressed along its actuation axis 21, the drive unit 20 is rotated around the Z-axis and at the same time hold in position with respect to a corpus 11, 13, 14 of the switch device. The drive unit 20 can be prevented from moving along the actuation axis 21 in Z direction, especially by inner wall 14 and the wall above part 20. During actuation along actuation axis 21, the actuation device 20a engages with recesses 12 at the corpus, especially at inner wall 14. This ensures a mechanism 12, 22 to prevent button rotation responsive to a pushing action. In order to ensure an appropriate coupling between the actuation device 20a and the drive unit 20, the drive unit 20 can be provided with an inner screw thread also. Also another type of shape can be on shaft 21 and 20 to transform translation into a rotation. A pin 31 on 20 in a grove on 21 is also possible. The actuation device 20a can be brought back to a zero position when it has been pressed and moved in a direction to the z-direction, especially by an elastic element 50 which can be provided in the form of a strong spring, also preventing the actuation device 20a from being inadvertently pressed during rotation. The elastic element 50 can be provided in the form of a spring arranged around the shaft 24 and arranged between the screw thread 25 and one of the inner walls, especially wall 13. In other words, the elastic element 50 provides for a position return arrangement for bringing back the actuation device 20a along a translational direction, especially along the rotational axis 21. In order to ensure that the spring does not push out the actuation device 20a out of the switch device, a blocking element 23 can be provided on the shaft 24 at a position behind the wall 13. On rotation of the actuation device 20a, the drive unit 20 can be rotated likewise, especially when an interlocking device 31 is provided, e.g. in the form of a pin engaging the drive unit 20 in rotation. On rotation of the drive unit 20, a moving device 131; 231 can be moved. The motion of the moving device 131; 231 can provide for generating electric energy.

Figure 3:
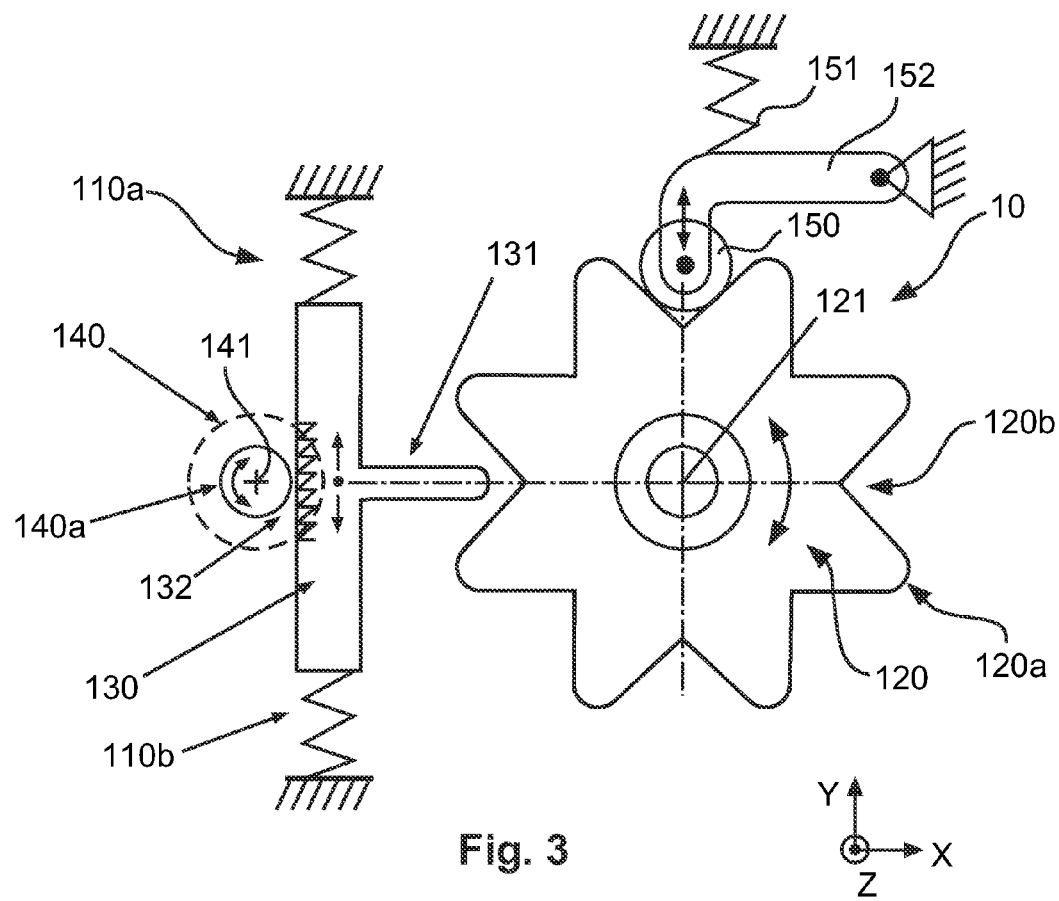
FIG. 3 shows a first embodiment of a mechanism for generating energy in a switch device, wherein a drive unit interacts with a moving device in order to set the moving device in motion along a translational axis, and energy is excited by an energy harvester mechanically coupled to the moving device.

FIG. 3 shows a drive unit 120 according to a first embodiment provided in the form of a gear wheel with recess portions 120b and protruding portions 120a. This gear wheel shown as 120 in FIG. 3 is also shown in FIG. 1 as drive unit 20. In particular, there are provided eight protruding portions 120a and eight recess portions 120b between the protruding portions 120a. It is not necessary to have eight protruding portions also more or less protruding portions is possible. The gear wheel 120 can be actuated around a rotation axis 121 by a force, e.g. a user, especially in both rotational directions, and in particular by an actuation device, as can be seen in FIG. 1, interacting with the drive unit 120. A moving device 130 is provided in the form of a block with a protrusion 131 protruding from the block in an x-direction towards the drive unit 120 into one of the recess portions 120b. The moving device 130 is arranged such that the protrusion 131 rests in a zero position with respect to an y-axis facing in a directing in which the moving device 130 can be set in motion by the drive unit 120, whereby the rotational movement of the drive unit 120 by a sufficient angle causes engaging the moving device 130 with at least one of the protruding portions 120a. Once disengaged from one of the protruding portions 120a as the rotational movement continues, the moving device 130 moves within the recess portions 120b, to finally assume the zero position. In order to automatically locate the moving device 130 in its zero position in one of the recess portions 120b, especially when there is no rotation of the drive unit 120, a position return device 110 is provided. The position return device is advantageously realized in form of two position return devices 110a, 110b provided at opposing ends of the moving device 130. The position return devices 110a, 110b can be provided in the form of positioning springs, which are advantageously configured to apply a force of attraction to the moving device 130, in order to bring back the moving device 130 to the zero position when no force in the y-direction is applied to the protrusion 131. It is not necessary to have two springs, one spring 110a or 110b connected to the housing and to portion 130 also provides the function of bringing back portion 130 in rest position.

More specifically, the protrusion 131 and the recess portions 120b can be designed such that the moving device 130 can only move when the drive unit 120 is rotated. Alternatively, the protrusion 131 and the recess portions 120b can be designed such that a motion of the moving device 130 (at least to a certain extend) can be realized also in case the drive unit 120 is not rotated. This can provide the advantage of generating energy also in case there is only a rotation of a small angle, as the moving device 130 can oscillate to a certain extend while the protrusion engages in one of the recess portions 120b and remains within one of the recess portions 120b. Further, the moving device 130 is provided with a rack portion 132, especially on a side surface of the moving device 130 opposed to the side of the moving device 130 from which the protrusion 131 protrudes. That is to say, the rack portion 132 can be provided at a side which is facing opposed to the x-direction. In order to generate energy for a switch device, a generator device 140 is provided which is configured to rotate around a generator axis 141. The generator device 140 has an engaging element 140a which is configured to interact with the rack portion 132. Advantageously, the engaging element 140a is provided in the form of a gear wheel. Energy for the switch device can be generated by converting mechanical energy respectively kinetic energy into electrical energy, which can be done by an energy harvester. According to the embodiment of FIG. 3, the energy harvester can be composed of the generator device 140 and the rack portion 132 and both positioning devices 110a, 110b. To control the position of the drive unit 120 in rotation around the z-axis more accurate, a force (e.g. spring or elastic member 151) loaded wheel 150 can be added that is forced into the recess portions 120b. The position of the wheel can be controlled by connecting the wheel to a lever 152, or also a linear guidance is possible. By adding the wheel 150 the position of the structured inner profile 22 and the mechanical blocking device 12 will align better to each other. Less run-in is needed resulting in smaller volume and stroke needed for the same performance As another option, the mechanical coupling between the moving device 130 and the generator device 140 can be realized by alternative couplings. Of course, the rack portion 132 is likely to be only one of the possible electromechanical arrangements.

Figure 4:
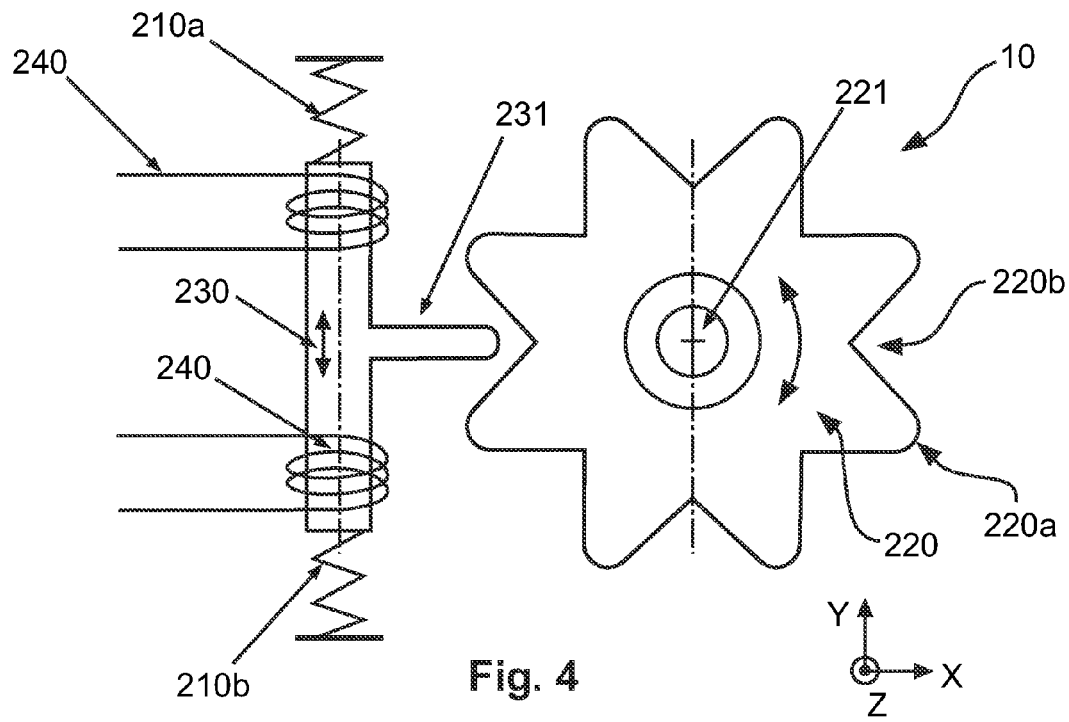
FIG. 4 shows a second embodiment of a mechanism for generating energy in a switch device, wherein a drive unit interacts with a moving device in order to set the moving device in motion along a translational axis, and energy is excited by an energy harvester electrically coupled to the moving device.

FIG. 4 basically shows a drive unit according to a second embodiment with a configuration like the one shown in FIG. 3, but there is a difference with respect to the energy harvester. FIG. 4 shows a drive unit 220 provided in the form of a gear wheel with recess portions 220*b* and protruding portions 220*a*. In particular, there are provided eight protruding portions 220*a* and eight recess portions 220*b* between the protruding portions 220*a*. The gear wheel 220 can be actuated around a rotation axis 221 by a force, e.g. by a user, especially in both rotational directions, and in particular by an actuation device (not shown) interacting with the drive unit 220. A moving device 230 is provided in the form of a magnetic block with a protrusion 231 protruding from the magnetic block in an x-direction towards the drive unit 220 and engaging in one of the recess portions 220*b*. The moving device 230 is arranged such that the protrusion 231 rests in a zero position with respect to a y-axis facing in a directing in which the moving device 230 can be set in motion by the drive unit 220. In order to automatically locate the moving device 230 in this zero position, especially when there is no rotation of the drive unit 220, two position return devices 210*a*, 210*b* are provided at opposing end portions of the moving device 230. The position return devices 210*a*, 210*b* can be provided in the form of positioning springs, which are advantageously configured to apply a force of attraction to the moving device 230, in order to bring back the moving device 230 to the zero position when no force in a y-direction is applied to the protrusion 231.

More specifically, the protrusion 231 and the recess portions 220*b* can be designed such that the moving device 230 can only move when the drive unit 220 is rotated. Alternatively, the protrusion 231 and the recess portions 220*b* can be designed such that a motion of the moving device 230 (at least to a certain extend) can be realized also in case the drive unit 220 is not rotated. This can provide the advantage of generating energy also in case there is only a rotation of a small angle, as the moving device 230 can oscillate to a certain extend while the protrusion engages in one of the recess portions 220*b* and remains within one of the recess portions 220*b*. In order to generate energy for a switch device, a generator device 240 is provided which is configured to generate electric energy based on a relative movement of the moving device 230 with respect to the generator device 240. Energy for the switch device can be generated by converting mechanical energy respectively kinetic energy into electrical energy, which can be done by the energy harvester. In particular, the generator device 240 is provided in the form of one or more conducting structures, e.g. coils, which are arranged around the oscillator device 230, especially the magnetic part of the oscillator device 230. By moving the oscillator device 230 relatively to the coils 240, a current can be induced in the coils 240, providing electric energy for the switch device. According to the embodiment of FIG. 4, the energy harvester can be composed of the generator device 240 and the moving device 230 itself and both positioning devices 210*a*, 210*b*.

Figure 5:
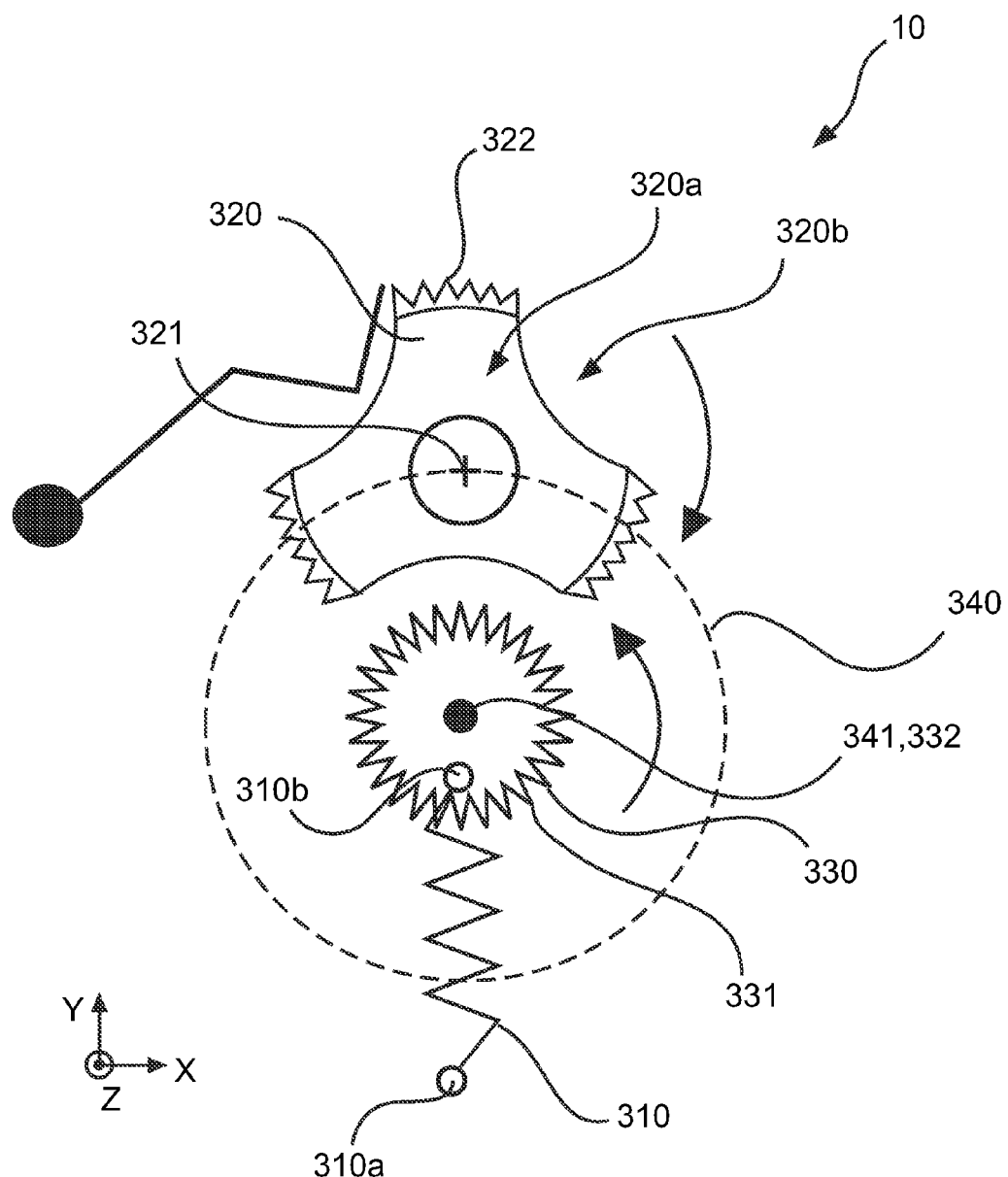
FIG. 5 shows a third embodiment of a mechanism for generating energy in a switch device, wherein a drive unit interacts with a moving device in order to set the moving device in motion around a rotation axis, and energy is excited by an energy harvester coupled to the rotation axis of the moving device.

FIG. 5 shows a drive unit 320 according to a third embodiment which is provided in the form of a kind of gear wheel with recess portions 320*b* and protruding portions 320*a*. In particular, by means of example, there are provided three protruding portions 320*a* and three recess portions 320*b* between the protruding portions 320*a*. The protruding portions 320*a* themselves have protruding elements 322, further protruding in a radial direction away from a rotation axis 321 of the drive unit 320 and provided in order to engage with a moving device 230. The drive unit 320 can be actuated around the rotation axis 321 by a force, e.g. by a user, especially in both rotational directions, and in particular by an actuation device (not shown) interacting with the drive unit 320. A moving device 330 is provided in the form of a kind of wheel with a plurality of protrusions 331 protruding in a radial direction from the rotation axis 332 of the moving device 330. In contrast to the embodiments shown in FIGS. 3 and 5, the protrusions 331 only engage with the protruding elements 322 of the protruding portions 320*a* of the drive unit 320. That is to say, when one of the recess portions 320*b* of the drive unit 320 is facing towards the moving device 330, the drive unit 320 and the moving device 330 do not interact, and the moving device 330 can move independently of the drive unit 320. The moving device 330 is arranged such that it rests in a zero position with respect to a specific rotation angle around the rotation axis 341 of the moving device 330 (around a z-axis). In order to automatically locate the moving device 330 in this zero position, especially when there is no rotation of the drive unit 320, a single position return device 310 is provided. It can be provided at an outer edge of the moving device 330 which can be symmetric with respect to its rotation axis 332.

More specifically, the position return device 310 can be provided in the form of a positioning spring, which is advantageously configured to apply a force of attraction to the moving device 330, in order to bring back the moving device 330 to the zero position when no torsion force around the z-axis respectively rotation axis 332 is applied to the protrusion 331. In order to generate energy for a switch device, a generator device 340 is provided which is configured to generate electric energy based on a movement of the moving device 330 by common rotation axis 341. Energy for the switch device can be generated by converting kinetic energy into electrical energy, which can be done by an energy harvester. The energy harvester can be provided as a step motor. When the moving device 330 is set in motion by the drive unit 320, the positioning device 310 coupled to the moving device 330 is urged to moved both in a y-direction and an x-direction. Therefore, the positioning device 310 can be arranged in bearings 310*a* which allow for rotation of the positioning device 310 around the bearings 310*a*. In particular, in a zero position, the rotation axis 321 of the drive unit 320, the rotation axis 341 of the moving device as well as the bearing points 310*a* can be arranged on one common axis, i.e. all bearings 321, 341, 310*a* are in line with each other.

Figure 6:
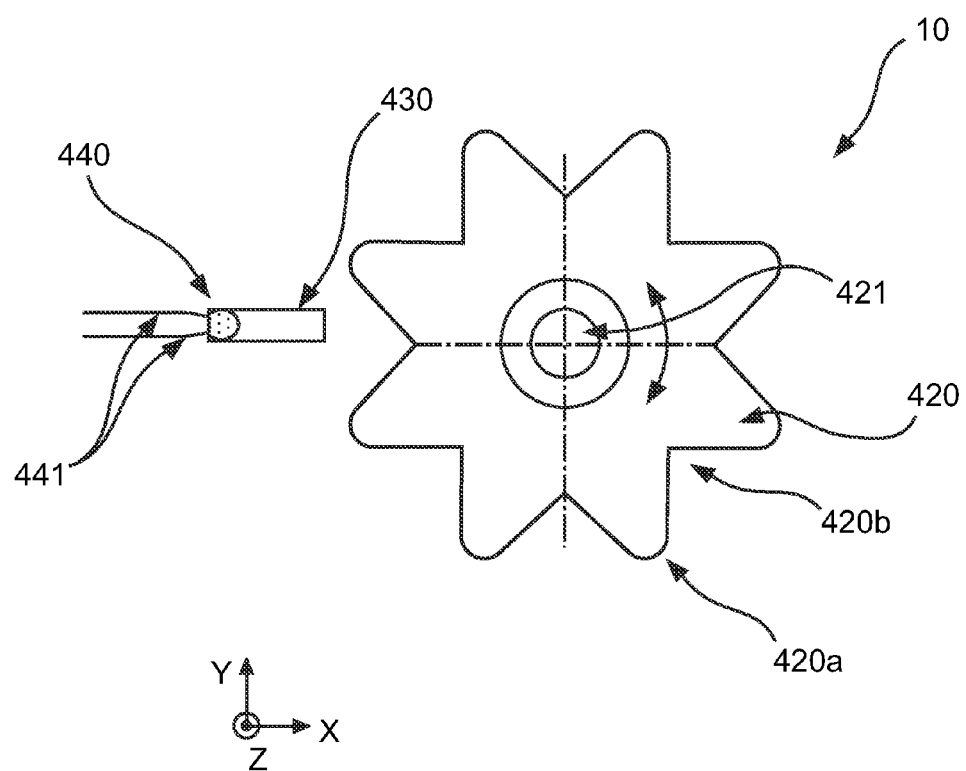
FIG. 6 shows a fourth embodiment of a mechanism for generating energy in a switch device.

FIG. 6 shows a drive unit according to a fourth embodiment with an arrangement which is comparable to the arrangement shown in FIG. 4, but the moving device 430 is provided in the form of an oscillating element, e.g. a piezoelectric bar. The moving device 430 is coupled to an anchorage 440, which is contacted via conducting wires 441. Here, the parts with reference numerals 420, 420*a*, 420*b* and 421 correspond to those parts with reference numerals 220, 220*a*, 220*b* and 221 in FIG. 4.

In summary, the present invention relates to an energy-harvesting switch device and method for generation of energy for operating the switch device, wherein the switch device is provided with a drive unit interacting with an actuation device operable by a user, and with a moving device configured to be set in motion by the drive unit, and with an energy harvester for providing energy to the switch device in dependence on a motion of the moving device, such that energy for commands or other operations is provided to the switch device. The moving device is configured to be repeatedly repositioned in relation to a defined zero position, as long as it has kinetic energy, in order to provide kinetic energy which can be converted in electric energy by the energy harvester. Such an electromechanical device for generating energy can ensure wireless operation without the need of batteries or any other kind of power supply.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein. In particular, other variable energy conversion mechanisms may be provided within the switch device, and other geometries or arrangements of the moving device may provide for a compact and efficient switch device.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. The mere fact that certain measures are recited in mutually different dependent claims does not indicate that a combination of these measures cannot be used to advantage.

Any reference signs in the claims should not be construed as limiting the scope thereof.

The invention claimed is:

1. A switch device comprising:
   a drive unit configured to interact with an actuation device operable by external force and provided at the switch device;
   a moving device configured to be set in motion by the drive unit;
   an energy harvester coupled with the moving device;
   a position return device coupled with the moving device; and
   wherein the moving device is configured to be repositioned by the position return device in relation to a defined zero position,
   wherein the switch device further comprises
   a sensor configured to detect an actuation of the actuation device and to differentiate between rotational actuation around an actuation axis and a translational actuation along the actuation axis;
   the switch being adapted to transmit different control signals corresponding respectively to the rotational actuation and the translational actuation;
   the switch comprising a blocking device arranged to prevent rotation of the actuation device when the actuation device is operated along the translational direction.

2. The switch device according to claim 1, wherein the actuation device is operable in both rotational directions around the actuation axis, wherein the drive unit engages with the moving device in the same way during operation of the actuation device in each of the rotational directions.

3. The switch device according to claim 1, wherein the actuation device is provided with a screw thread configured to connect the drive unit with the actuation device.

4. The switch device according to claim 1, wherein the actuation device is provided with a shaft which extends along the actuation axis of the actuation device and which is movably arranged within a corpus of the switch device, and wherein an elastic element is provided at the shaft between the actuation device and the corpus.

5. The switch device according to claim 1, wherein the actuation device is elastically arranged within a corpus of the switch device.

6. The switch device according to claim 1, wherein the moving device is provided with at least one protrusion which is configured to engage in recess portions of the drive unit.

7. The switch device according to claim 6, wherein the position return device coupled to the moving device is composed of one or several mechanical elements.

8. The switch device according to claim 1, wherein the energy harvester is composed of a magnetic block arranged at the moving device and at least one conducting element with respect to which the moving device moves.

9. The switch device according to claim 8, wherein the moving device is supported in guidance which extends orthogonal to a rotation axis of the drive unit, and the energy harvester is composed of a rack portion provided on the moving device.

10. A switch device comprising:
    a drive unit configured to interact with an actuation device operable by external force and provided at the switch device;
    a moving device configured to be set in motion by the drive unit;
    an energy harvester coupled with the moving device; and
    a position return device coupled with the moving device,
    wherein the moving device is configured to be repositioned by the position return device in relation to a defined zero position, and
    wherein the actuation device is operable in both rotational directions around an actuation axis, wherein the drive unit engages with the moving device in the same way during operation of the actuation device in each of the rotational directions.

11. The switch device according to claim 10, wherein the switch device further comprises a blocking device arranged to prevent rotation of the actuation device when the actuation device is operated along a translational direction along the actuation axis.

12. The switch device according to claim 11, wherein the switch further comprises a sensor configured to detect an actuation of the actuation device and to differentiate between rotational actuation around the actuation axis and a translational actuation along the actuation axis, the switch being adapted to transmit different control signals corresponding respectively to the rotational actuation and the translational actuation.

13. A switch device comprising:
    a drive unit configured to interact with an actuation device operable by external force and provided at the switch device;
    a moving device configured to be set in motion by the drive unit;
    an energy harvester coupled with the moving device; and a position return device coupled with the moving device, wherein the moving device is configured to be repositioned by the position return device in relation to a defined zero position, wherein the actuation device is configured to implement a rotational actuation around an actuation axis and a translational actuation along the actuation axis, and wherein the moving device is configured to be set in motion and induce energy harvesting by the energy harvester in response to the translational actuation.

14. The switch device according to claim 13, wherein the moving device is configured to be set in motion and induce energy harvesting by the energy harvester in response to the translational actuation and in response to the rotational actuation.

15. The switch device according to claim 13, wherein the switch device further comprises a blocking device arranged to prevent rotation of the actuation device when the actuation device is operated along a translational direction along the actuation axis.

16. The switch device according to claim 15, wherein the switch further comprises a sensor configured to differentiate between the rotational actuation and the translational actuation, the switch being adapted to transmit different control signals corresponding respectively to the rotational actuation and the translational actuation.

* * * * *